Figure 10:
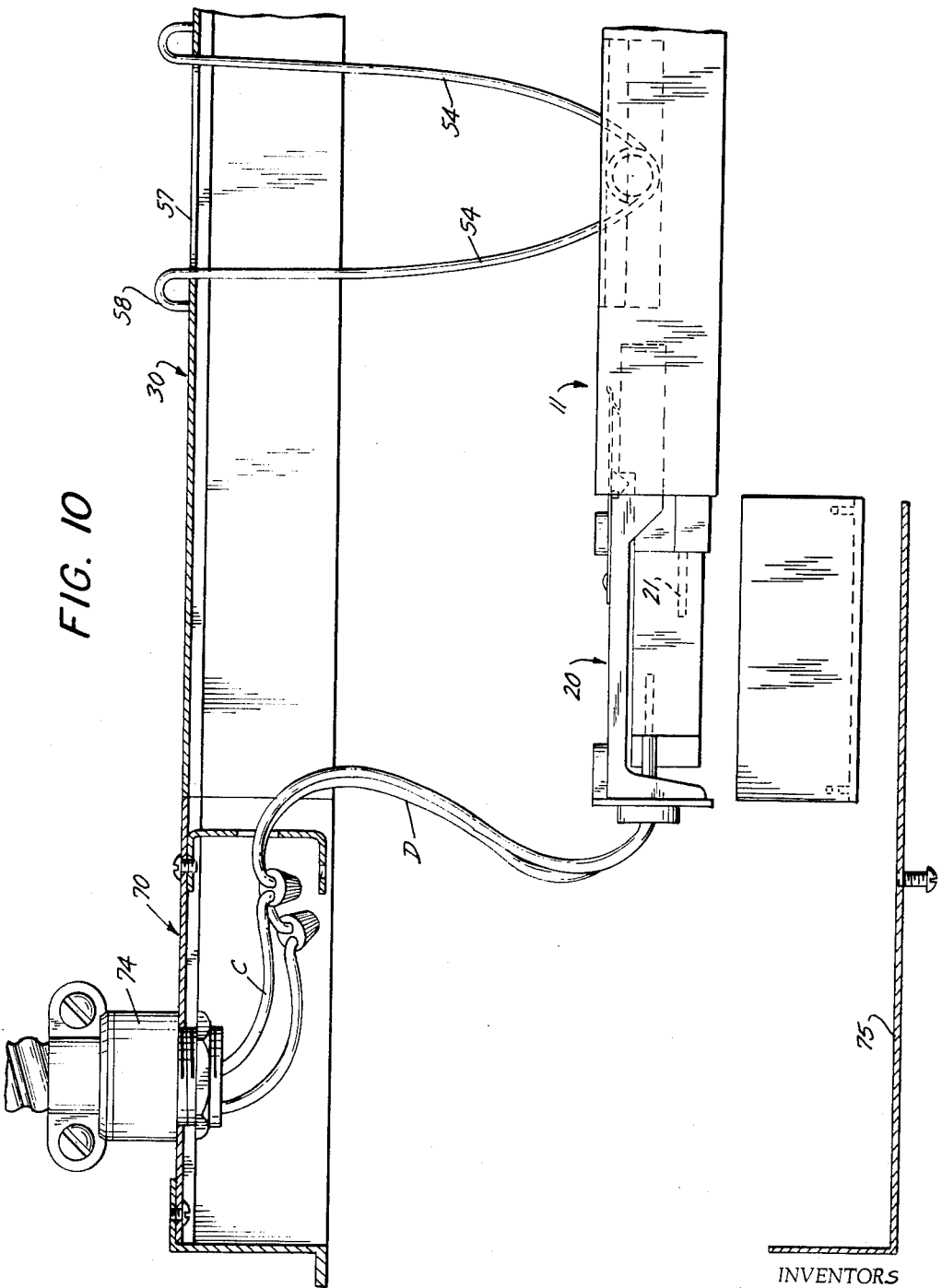

April 12, 1966 M. NEUMANN ET AL 3,246,074
RECESSED MOUNT FOR ELECTRIC POWER DISTRIBUTION TRACK
Filed Aug. 12, 1963 3 Sheets-Sheet 1
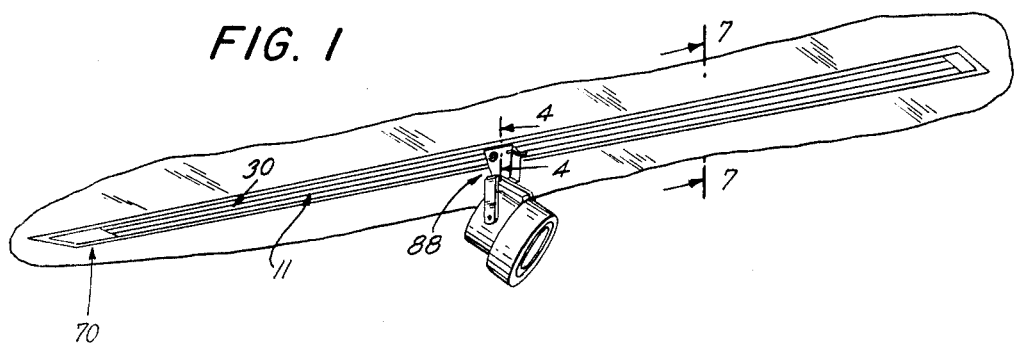
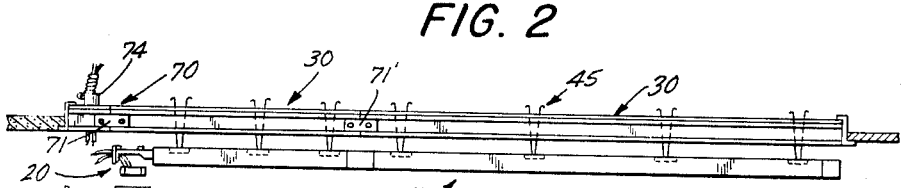
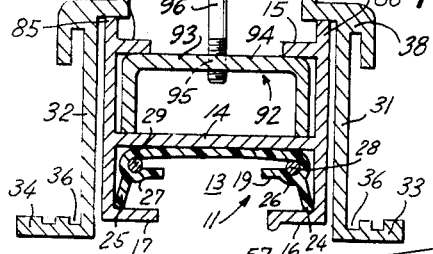
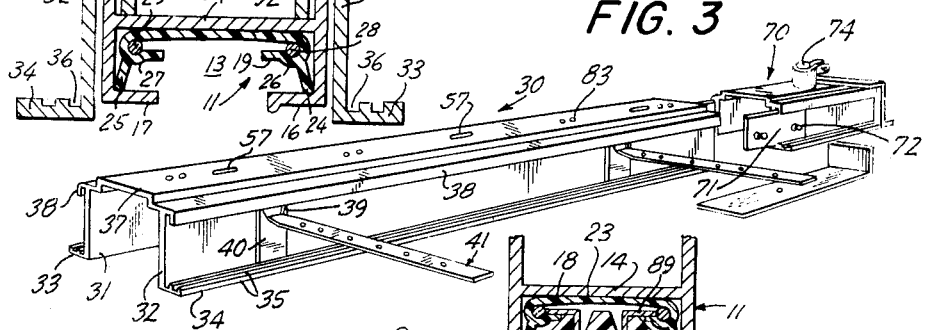
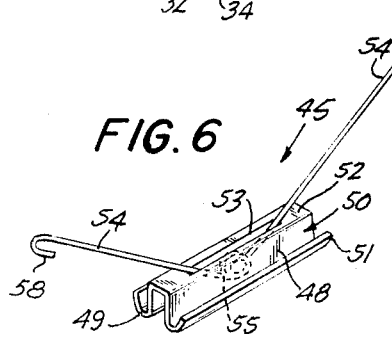
INVENTORS
MANFRED NEUMANN
ANTHONY DONATO
BY
Dean, Fairbank & Hirsch
ATTORNEYS

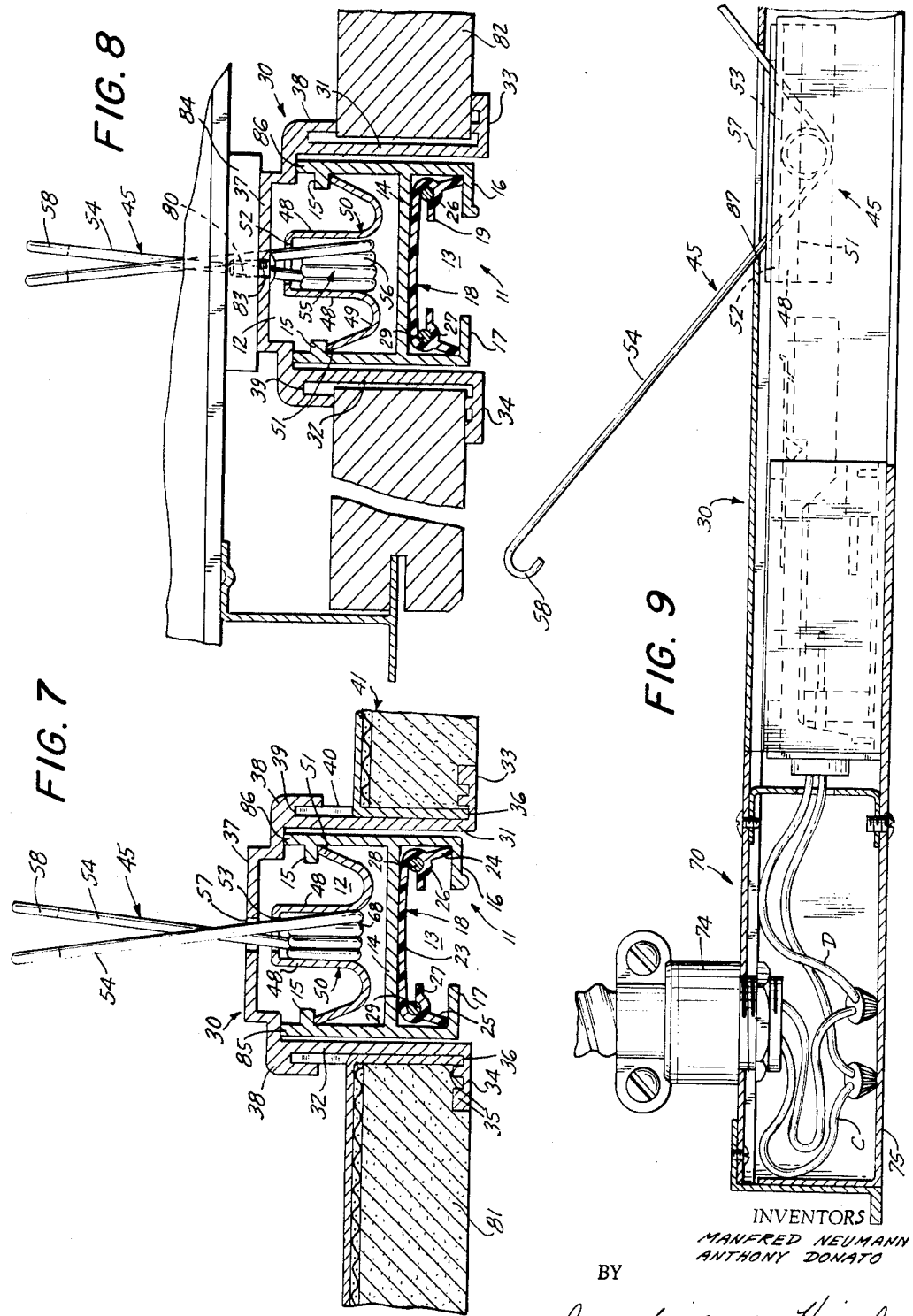

United States Patent Office 3,246,074
Patented Apr. 12, 1966

3,246,074
RECESSED MOUNT FOR ELECTRIC POWER
DISTRIBUTION TRACK
Manfred Neumann, River Edge, and Anthony Donato,
Woodbridge, N.J., assignors to Lightolier Incorporated,
New York, N.Y., a corporation of New York
Filed Aug. 12, 1963, Ser. No. 301,481
11 Claims. (Cl. 174—48)

This invention relates to the art of electric power distribution systems of the type utilizing power distribution tracks having conductors arranged within a flanged channel, extending through the area in which power distribution is to be effected and more particularly to a system of the above type in which the power distribution track is mounted flush with the ceiling or wall along which power distribution is to be effected.

As conducive to an understanding of the invention, it is to be noted that a variety of power distribution tracks, such as for example, as shown in co-pending application Serial No. 282,538, filed May 21, 1963, have been evolved for extending electrical conductors through an area in which electric power is desired, to permit coupling thereto of electrical equipment in the area at any point along the length of the power distribution track.

The power distribution track as shown and described in said co-pending application Serial No. 282,538, is mounted on the surface of a wall or ceiling along which power distribtuion is to be provided and protrudes outwardly from said surface. This surface mounting, though suitable in many installations, in some situations is undesirable, due to the fact that the protruding track interferes with desired decorative effects or cut down on the available clearances in the area so that moving objects adjacent the track will either damage the track or the object itself may be damaged by contact with the track.

It is accordingly among the objects of the invention to provide a power distribution system of the above type in which the power distribution track is mounted so that its exposed surface which affords access to the conductors carried by the track, is flush with the supporting wall or ceiling, thereby minimizing interference with the desired decorative efforts or undesired protrusion of the track into the area.

A further object of the invention is to provide a mount for supporting a track of the above type with its exposed surface flush with respect to the surface along which the track is positioned, which mount permits ready installation thereinto and removal therefrom of the track with maximum rapidity and efficiency, without the requirement of specialized tools or skills.

According to the invention the mount comprises an elongated, substantially U-shaped housing, preferably formed from extruded aluminum and dimensioned to permit insertion of the track therein. The parallel side walls of the housing are provided with outwardly extending lateral flanges at their free ends which provide a trim frame in dry type ceilings or a plaster frame in plaster ceilings.

A channel shaped suppporting flange extends outwardly from each of the side walls of the housing adjacent the crosspiece thereof and respectively extends parallel to the associated flange at the free end of each side wall, said pairs of parallal flanges being contoured to accommodate the root ends of outwardly extending latching tabs such as normally employed in connection with plaster ceilings. A splice box is secured to one end of the housing for introduction of the conductors from the power system to the power distribution track. Releasable retaining means are employed to effect mechanical connection between the power distribution track and the housing and permit lowering of the track from said housing.

In the accompanying drawings in which is shown one or more of various possible embodiments of the several features of the invention, FIG. 1 is a perspective view of the installation shown arranged within a ceiling to support a power distribution track to which a spot light is illustratively connected, FIG. 2 is an exploded elevational view of the installation with the spot light removed, FIG. 3 is a perspective detail view of the housing component shown in position prior to arrangement with respect to a wall or ceiling, FIG. 4 is a detail sectional view taken along line 4—4 of FIG. 1, FIG. 5 is a transverse sectional view showing one embodiment of the means to connect the track and housing, FIG. 6 is a perspective view of another embodiment of the retaining means, FIG. 7 is an enlarged cross sectional view taken along line 7—7 of FIG. 1 showing the housing arranged in a plaster ceiling, FIG. 8 is a cross sectional view similar to FIG. 7 showing the housing arranged with respect to an acoustical tile ceiling, FIG. 9 is an enlarged longitudinal sectional detail view through the splice box end of the housing, and FIG. 10 is an enlarged exploded view similar to FIG. 2 showing the housing and splice box in cross section and illustrating connection between the splice box and the power distribution track as well as showing the spring retainer in operative position with the track out of the housing.

Referring now to the drawings, in the illustrative embodiment shown, the power distribution track is of the type more fully described in co-pending application Serial No. 282,538.

As described in this co-pending application, the track 11 comprises an elongated member, preferably of extruded aluminum formed with two substantially U-shaped channels 12 and 13, spaced by a common partition or wall 14. The channel 12 is formed with inturned spaced flanges 15 positioned below the upper edges of the legs of the channel and channel 13 is formed with inturned spaced flanges 16 and 17 at the free ends of the legs thereof.

Positioned in channel 13 is an elongated insulating strip 18 which is formed with a base 23 adapted to lie against and be secured to partition or wall 14. Spacer legs 24 and 25 are formed integral with the lateral edges of base 23 and depend therefrom with the free ends of said legs reacting against channel flanges 16 and 17 respectively as best shown in FIGS. 7 and 8 so as to bias the base 23 against wall 14. Curved conductor engaging flanges 26 and 27 formed integral with legs 24 and 25, define sheaths extending inwardly therefrom and surrounding conductors 28 and 29 respectively. Lips 19 extend inwardly from the inner edges of sheaths 26 and 27 and are slightly spaced from and extend parallel to base 23 so as to limit access to conductors 28 and 29 only along a plane parallel to the surface of base 23, whereby inadvertent contact with the conductors is prevented.

As the details of the track construction are more fully described in the aforementioned co-pending application, they will not herein be further described.

In order to effect a connection between the conductors 28 and 29 of the track 11 with the available power supply, the track end mounting connected assembly 20, as shown in FIG. 10, is employed.

Thus, the protruding ends 21 of the conductors 28, 29 are connected by such connector assembly 20 to leads D as shown in FIG. 10.

As this track and mounting connector assembly is shown and described in detail in said co-pending application Serial No. 282,538 and per se forms no part of the present invention, it will not be further described herein.

Means are provided to mount the track 11 so that the exposed face thereof which provides access to conductors 28 and 29 will lie flush with the mounting surface such as a ceiling or wall. To this end, an elongated, substantially U-shaped housing 30 is provided, preferably of extruded aluminum. The housing 30, as best shown in FIGS. 3 and 7, is of channel shaped configuration, having side walls 31 and 32 extending substantially parallel to each other and spaced apart a distance such as to accommopdate track 11 therebetween.

The free ends of the legs 31, 32 of the side walls of the housing are provided with lateral outwardly extending flanges 33, 34 respectively. Ridges 35 are preferably formed on the upper surfaces of flanges 33 and 34 so that as hereinafter more fully described, a secure frictional grip is provided between the housing and the wall or ceiling material, be it plaster or ceiling tile, said ridges 35 defining an elongated groove 36 adjacent side walls 31, 32 respectively as shown in FIG. 7. The cross piece 37 of the housing 30 which is spaced from the flanges 33 and 34, by a distance such as to define a recess that will accommodate the track 11, provides a surface to which the track 11 may be removably secured as will be more hereinafter described.

Extending laterally outward from the side walls 31, 32 adjacent said cross piece 37 and aligned respectively with flanges 33 and 34 are flanges 38, each of which has a channel or groove 39 in its undersurface aligned with the associated groove 36. The aligned pairs of grooves 36, 39 serve to receive the edges of a plate 40 formed on the end of a lathing strip 41 which outwardly at right angles to the plane of the associated plate 40 as is clearly shown in such FIGS. 3 and 7.

According to one embodiment of the invention, the track is releasably retained in the housing by spring retainers 45 of the type shown in Patent No. 2,701,299. As is clearly shown in the drawings, a plurality of such spring retainers 45 are provided, each of which comprises a U-shaped channel mount 50, the free ends of the legs 48 of which are reversely bent as at 49 so that when the mount is positioned in channel 12 of the track, the ends 51 of legs 48 will engage beneath the inwardly extending flanges 15 as is clearly shown in FIG. 7, for example.

The crosspiece 52 of the mount 50 has an elongated longitudinal slot 53 through which extends the legs 54 of a torsion spring 55, the coil 56 of which defines the base of the spring and is positioned beneath crosspiece 53 between legs 48. The legs 54 of each of the spring 55 extend through an associated longitudinal slot 57 in the crosspiece of the housing and when the coil 56 of the spring is unstressed, the legs 54 extend outwardly at substantially right angles to each other. Each of the legs 54 has an enlargement, illustratively an outwardly extending bent portion 58 which defines a stop at the free end thereof.

Secured to the housing 30 at one end thereof as shown in FIGS. 3, 7 and 10, for example, is a splice box 70 which has a cross sectional dimension and configuration similar to that of the housing 30. The splice box and the housing are secured together as by connector strips 71 which coact with the aligned grooves 36, 39 in flanges 33, 34 and 38 in the same manner as the plates 40 of lathing strips 41, the strips being secured to side walls 31, 32 of the housing and the connector box by screws 72.

At the upper surface of the splice box 70, a connector 74 of conventional type is provided through which extends the power cable as shown in FIGS. 9 and 10. The conductors C leading from the power cable are connected to leads D which in turn are connected in suitable manner to the conductors 28, 29 of the track 11. As this is fully described in said co-pending application Serial No. 282,538, it will not be further described.

An L-shaped cover 75 is secured to the splice box to extend over its open mouth and also over the connector 20 to completely conceal the splicing area when the unit is assembled.

Where it is desired to connect two adjacent housings 30 together in end to end relation, as shown in FIG. 2, connector strips 71' identical to strips 71 may be used to coact with the aligned grooves 36, 39 in flanges 33, 34 and 38 of the adjacent housings 30.

In use of the above construction, the housing 30 is first installed in a ceiling or wall. Thus, in the embodiment of FIG. 7, the housing is installed in a plaster ceiling 81 in which case the lathing strips 41 are secured to the plaster ceiling in conventional manner and the flanges 33, 34 provide a frame. In the embodiment of FIG. 8, the housing is installed in a dry type ceiling in which the edges of adjacent tiles 82 are positioned between the flanges 38, 33 and 38, 34, and the crosspiece 37 of the housing is secured by means of screws 80 (FIG. 8) extending through openings 83 in the crosspiece 37 to a strip 84 secured to the structural wall or ceiling in any suitable manner.

In both cases the legs 54 of the springs are free to extend upwardly through the slots 57 of the housing 30.

As the method of mounting the housing would be obvious to one skilled in the art of building construction, it will not be further described.

After the housing 30 is mounted as above described, the track 11 is positioned immediately below the housing and the legs 54 of each of the spring retainers are moved together and passed through the slots 57 in the housing. Thereupon, the legs are released and by reason of the tension of the coil 56 of the spring, they will tend to move apart.

With the track 11 in its lowermost position, as shown in FIG. 10, the bent ends 58 of the legs 54 of the torsion spring will engage the ends of each of the slots 57, to limit the downward movement of the track.

When the track is pushed upwardly, the legs will both rise and move apart so that when the upper ends 85 of the legs 86 of the channel 12 abut against the undersurface of the crosspiece 37 of the housing, as shown in FIGS. 7 and 8, the legs 54 of the spring will have moved to the position shown in FIG. 9 in which the legs 54 will bear against the ends of the slots 57 as at 87, securely to retain the track in retracted position in the housing.

Although the track may have any suitable connector member connected thereto to provide electrical connection between the conductors of the track and electrical equipment, in the illustrative embodiment shown, a connector pulg 88 of the type shown in co-pending application Serial No. 288,420 is employed.

The connector plug, as shown in FIG. 4, has outstanding contact fingers 89 which, when the plug body 91 is rotated, will enter the space between lips 19 and the base 23 of the insulating strip to make dependable electrical connection with conductors 28, 29.

In the embodiment shown in FIG. 5, the track 11 is releasably connected to the housing 30 by a mounting assembly 92 which comprises a substantially U-shaped strip 93 slidably positioned between the wall 14 of the track 11 and the flanges 15. The cross piece 94 of strip 93 has a threaded opening 95 to receive the end of a screw 96 which extends through opening 83 in the cross piece 37 of the housing 30.

With the constructions above described, a recessed housing is provided which may readily be mounted in a ceiling or wall and which permits ready mechanical connection of a power distribution track thereto so that the latter will be flush with such ceiling or wall and may readily be moved out of the housing for maintenance.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A power distribution track assembly comprising an elongated rigid track member having a supporting channel and a conductor carrying channel, a pair of conductors positioned in said conductor carrying channel in spaced insulated relationship and extending the length thereof, said conductor carrying channel having an open face extending the length thereof, providing access to said conductors, an elongated substantially U-shaped housing having an open mouth and being of depth sufficient to accommodate said track, and means releasably retaining said track in recessed position in said housing with the open face of the conductor carrying channel substantially flush with the mouth of said housing.

2. The combination set forth in claim 1 in which said housing has a crosspiece having an opening and the means releasably retaining said track in said housing comprises a spring retainer member carried by said track, said retainer member having a base mounted in said supporting channel and at least one leg extending through said opening in the cross piece of said housing, said leg being resiliently urged to coact with said opening to retain said track in such recessed position, said leg having a stop near its outer end to limit the displacement of said track away from said housing.

3. The combination set forth in claim 2 in which said retainer member has a pair of legs resiliently urged apart, and extending through said opening, each of said legs having an enlargement at its outer end defining a stop.

4. The combinaiton set forth in claim 2 in which said retainer member comprises a torsion spring having a pair of legs resiliently urged apart, said opening in said housing is an elongated slot through which said legs extend, said legs coacting with the ends of the slot to retain the track in recessed position, each of said legs having an enlargement at its outer end defining a stop to limit the displacement of said track away from said housing.

5. The combination set forth in claim 2 in which said retainer member comprises a substantially U-shaped mount, said mount having a cross piece with a slot therethrough, a torsion spring having a coil with a pair of legs, said coil defining the base of the spring being positioned in said mount with said legs extending through said slot and normally resiliently urged apart, said opening in said housing is an elongated slot through which said legs extend, said legs coacting with the ends of the slot in said housing to retain the track in recessed position, each of said legs having an enlargement at its outer end defining a stop to limit the displacement of said track away from said housing.

6. The combination set forth in claim 5 in which said housing has a plurality of longitudinally aligned slots in the crosspiece thereof and a plurality of retainer members are provided, the legs of each retainer member extending through an associated slot.

7. The combination set forth in claim 2 in which said supporting channel is substantially U-shaped having a pair of opposed parallel legs, a flange extends inwardly from each of said legs, said retainer member comprises a substantially U-shaped mount, and having portions protruding outwardly from the sides thereof beneath said flanges to be restrained thereby, said mount having a crosspiece with a slot therethrough, a torsion spring having a coil with a pair of legs, said coil being positioned in said mount with said legs extending through said slot, said opening in said housing is an elongated slot through which said legs extend, said legs contacting the ends of the slot in said housing to retain the track in recessed position, each of said legs having an enlargement at its outer end defining a stop to limit the displacement of said track away from said housing.

8. The combination set forth in claim 1 in which said supporting channel is substantially U-shaped having a pair of opposed parallel legs and a wall intervenes between said supporting channel and said conductor carrying channel, a flange extends inwardly from each of said legs into said supporting channel the means releasably retaining said track in said housing comprises a substantially U-shaped mount having a pair of parallel legs, said mount being positioned between said flanges and said wall, said U-shaped housing having a crosspiece between the legs thereof and means carried by said U-shaped mount extending through the crosspiece of said U-shaped housing and contacting said housing releasably locking the mount and the U-shaped housing together.

9. The combination set forth in claim 1 in which said housing has a pair of parallel spaced side walls, flanges extend laterally outward from each of said side walls at each end thereof, each of said flanges having a groove on the inner surface thereof, and a lathing strip having a mounting plate is located at one end perpendicular to the length of said strip and mounted in opposed grooves in each pair of flanges whereby said strips extend outwardly from each of the side walls of said housing.

10. The combination set forth in claim 1 in which said housing has a pair of parallel spaced side walls, flanges extend laterally outward from each of said side walls at each end thereof, each of said flanges having a groove on the inner surface thereof, together with a second housing having a cross sectional dimension and configuration corresponding to that of said first housing, and a pair of connector strips mounted respectively in opposed grooves in each pair of flanges of said housing, maintains said two housings in end to end assembled relationship.

11. The combination set forth in claim 10 in which screws extend through each end of each of said strips into the side wall of said housings securely to retain said housings together.

References Cited by the Examiner

UNITED STATES PATENTS

| | | | |
|---|---|---|---|
| 1,298,842 | 4/1919 | Wetmore | 24—215 |
| 2,103,072 | 12/1937 | Frank. | |
| 2,209,560 | 7/1940 | Carlson | 174—95 X |
| 2,220,825 | 11/1940 | Place | 85—5 X |
| 2,743,423 | 4/1956 | Parks | 339—21 |
| 2,888,113 | 4/1959 | Schwartz et al. | 240—51.11 X |
| 2,966,542 | 12/1960 | Shields | 174—72 X |
| 2,977,566 | 3/1961 | Neumann et al. | |
| 3,019,332 | 1/1962 | Schiffer | 240—51.11 X |
| 3,042,889 | 7/1962 | Johnston et al. | 174—99 X |
| 3,051,772 | 8/1962 | Davis | 174—99 X |
| 3,094,584 | 6/1963 | Liberman et al. | 174—61 X |

OTHER REFERENCES

Electrical Construction and Maintenance, August 1953, p. 57 "Bulldog Electric Products Company" (Advertisement).

ROBERT K. SCHAEFER, *Primary Examiner.*

DARRELL L. CLAY, JOHN F. BURNS, *Examiners.*

W. B. FREDRICKS, *Assistant Examiner.*